Figure 1:
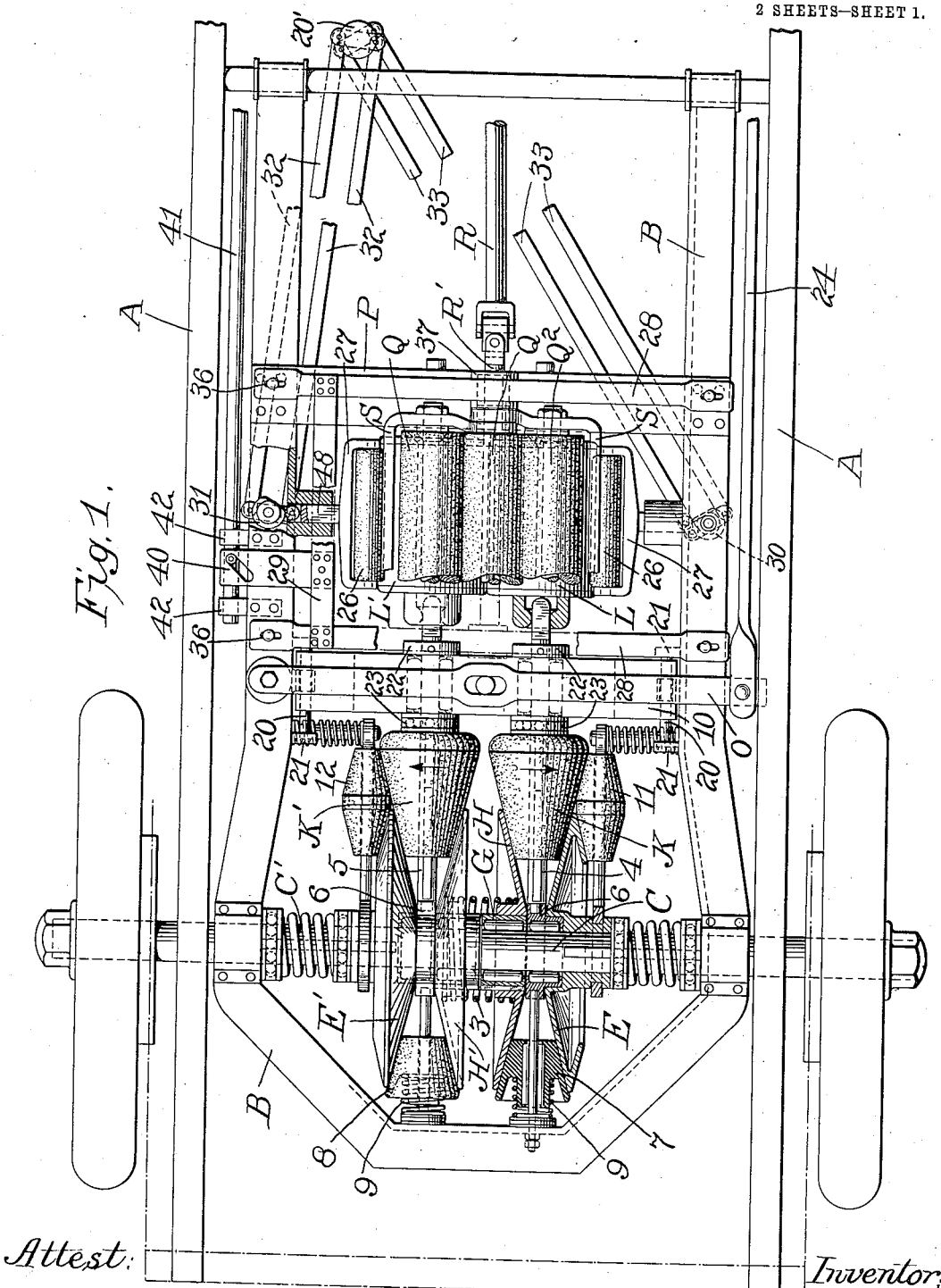

R. C. MANGUM.
DRIVING MECHANISM FOR VEHICLES.
APPLICATION FILED JUNE 11, 1912.

1,076,132.

Patented Oct. 21, 1913.

2 SHEETS—SHEET 1.

Attest:
Ewd L. Tolson
C E Parsons

Inventor:
Robert C. Mangum,
by Spear, Middleton, Donaldson & Spear
Att'ys

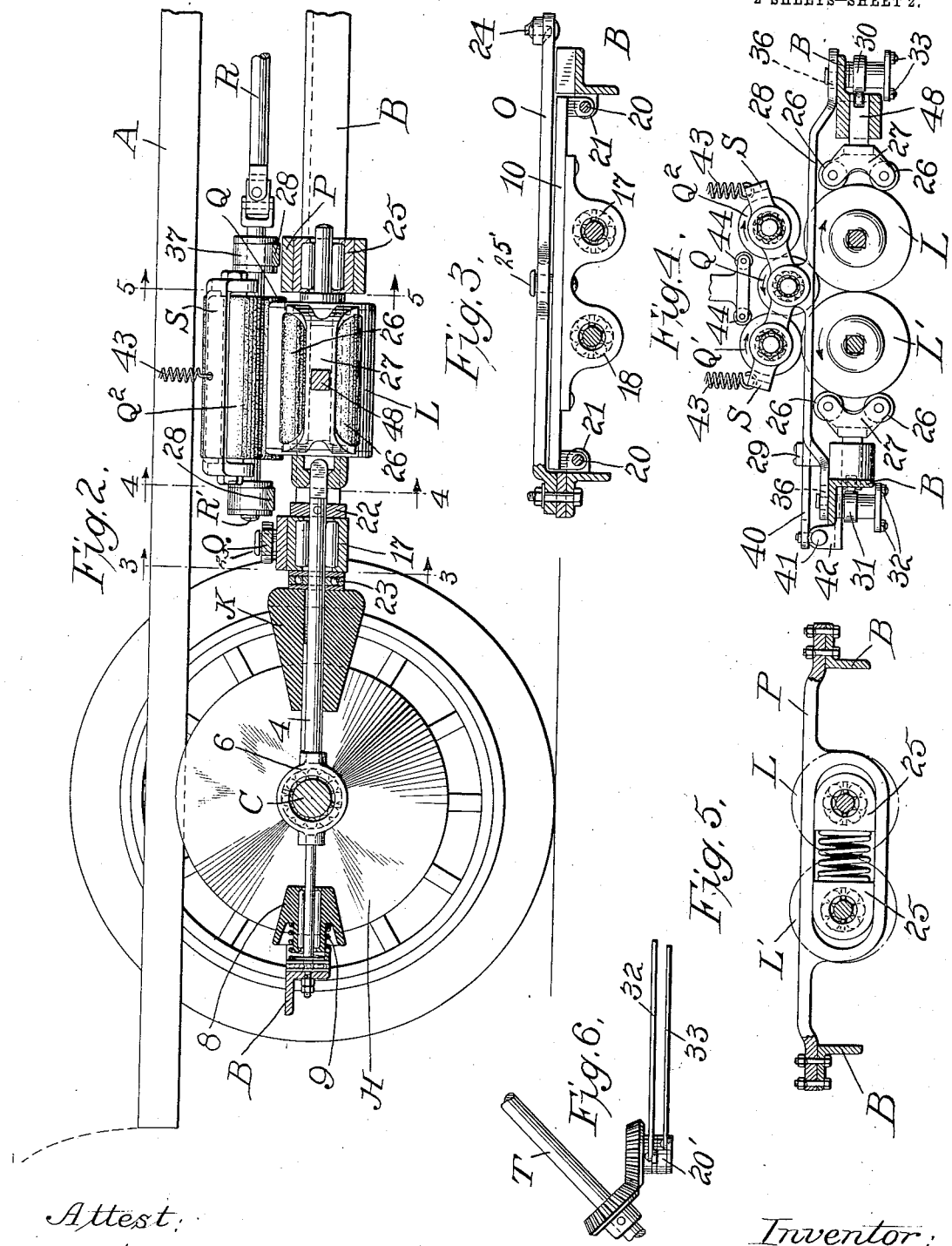

UNITED STATES PATENT OFFICE.

ROBERT C. MANGUM, OF WASHINGTON, DISTRICT OF COLUMBIA.

DRIVING MECHANISM FOR VEHICLES.

1,076,132. Specification of Letters Patent. Patented Oct. 21, 1913.

Application filed June 11, 1912. Serial No. 703,048.

*To all whom it may concern:*

Be it known that I, ROBERT C. MANGUM, citizen of the United States, residing at Washington, District of Columbia, have invented certain new and useful Improvements in Driving Mechanism for Vehicles, of which the following is a specification.

My invention hereinafter described, relates to variable speed driving mechanism for vehicles, of the frictional class, the main object of which is to provide a frictional mechanism better adapted to the special use, and which shall comprise in the power transmission mechanism, means for steering, for varying the speed, and for giving the driving wheels independent movement in going around curves.

The invention is comprised in the details of construction hereinafter described and shown in the accompanying drawings, in which—

Figure 1 is a plan view of a machine embodying my improved transmission gearing with parts broken away, and parts in section. Fig. 2 is a longitudinal vertical section of Fig. 1. Fig. 3 is a transverse section on the line 3—3 of Fig. 2, viewed in the direction of the arrows. Fig. 4 is a similar section on the line 4—4 of Fig. 2. Fig. 5 is a similar view on the line 5 of Fig. 2, and Fig. 6 is a detail of the control connections at the steering post.

The main frame of the vehicle is shown at A, and within this is a sub-frame B, in which are the bearings of the divided drive wheel axle, C, C′. Splined on these shaft parts are two friction driving disks E, E′. They are under the pressure of springs which bear at their outer ends on the frame B, and on their inner ends upon the hubs of these drive disks. Two roller bearings G are loosely mounted upon the parts of the divided axle and upon these bearings are splined two interior wheels H, H′, pressed normally outward, toward the drive wheels, by the interposed spring 3. These wheels are beveled, as shown, and interposed between them are the driving cones K, K′, in shape rather of the frustum of a cone, the taper of which corresponds with the bevel of the wheels, both having suitable frictional surfaces. The driving cones are splined on shafts 4, 5, which have their rear bearings in roller collars 6, on the axle parts. Opposite these driving cones are counterbalancing cones 7 and 8, on shafts which have their bearings in the collars 6, at the inner ends, and at the outer in the frame B. These cones are pressed to their bearings on the disks by springs 9 with a force sufficient to counteract upon the driving cones pressing on the opposite sides of the disks. As they move freely on their shaft, they adjust themselves automatically to the movements of the driving disks. The driving cones are splined on these shafts, and these shafts, bearing at their rear ends in the collars, have universal joint connections with the shafts of the main drive rolls L and L′, and bearings in a cross-bar 10, on the frame B, as shown in Fig. 3. Counteracting idle double cones 11, 12 bear on the main driving cones and disks. These are mounted on spindles collared on hubs of disks E and E′, which spindles are supported on brackets on frame B, and are pressed inwardly by springs on said brackets, to counteract against the pressure of the driving cones.

The front ends of the driving cone shafts are supported in anti-friction bearings 17, 18, on crossbar 10, supported on frame B. The crossbar 10 has front and rear movement on rods 20, set in ears 21, on the frame B. The bearings are confined between collars 22 fixed on the shafts, and anti-friction collars 23, interposed between the bearings and the head of the driving cones. The arrangement is such that the bar with its bearing boxes, may move on the cone shafts and thereby bear on the cones and press them in working contact with the disks, and to different extents, to vary the speed. This movement is effected by a lever O, pivoted on the frame and operated by a rod 24 through the central pin connection 25′. Rod 24 is connected with a suitable shift lever, not shown. It will be understood that the driving disks, under action of their springs advance or recede as the cones are shifted, so that the working contact remains substantially the same, but is nearer to or farther from the edges, and thus drives slower or faster. These variations of the speed may be within the limits of movement, manifestly to any degree.

The cone wheels K, K′ are driven, through the universal joint connections, by the friction cylinders L, L′, which have their shafts bearing in boxes 25, on the cross bar P, of the frame B. These boxes are held in a loop on the underside of this cross bar, and have limited lateral movement, permitted by the universal joint connections with the cone shafts, and required for the operation of the cylinders L, L', as hereinafter explained. Normally these cylinders are held apart, just out of frictional contact, by the interposed springs, but may be forced into contact by push rollers 26, carried on frames 27, which frames have stems 48, movable in holes in blocks on the frame B. The stems extend through the vertical flange of the frame, and are operated by means of cams 30 and 31, moved by the steering post (not shown) through connecting pairs of rods 32 and 33. The cams 30 and 31 are arranged so that when the post 20', (looking at Fig. 1) is turned to the right, the low part of cam 31, will be brought to bear on the stem of push rollers 26, and the corresponding friction roller will be released and pressed back by its spring. At the same time the other cam will bear on the other stem of the push rollers, and will press the other friction roller toward the center line between said friction rollers, and reverse movement of the post 21' will produce the reverse effect on the friction rollers L, L'. The universal joints on the shafts permit the slight lateral motion above described. Movement of these main friction rollers, which directly drive the friction cones, is derived, directly or indirectly from the friction roller Q on the main drive shaft R, R'. Of these parts, R' has its bearings on a frame of which 28, 28 are cross bars. These cross bars have limited sliding connection with subframe B, as indicated at 36. One of the bearings of shaft R' is shown at 37; the other being in the broken out part of the other bar and not shown.

The cross bar 29 has an arm 40 extending laterally over frame B, and is provided with a slot in which engages a pin fixed in a reciprocating rod 41, borne in ears 42 (also on frame B) and leading to a reversing lever, not shown. A yoke S has central bearings on its ends or cross pieces, and is thereby mounted on the shaft R'. This yoke is carried by the frame 28, 28 and 29, and has the same movement therewith, lateral and limited, and it has also slight rocking movement on shaft R'. It is suspended at the ends on the main body of the machine, and is connected therewith by coiled springs 43 (Figs. 2 and 4). The yoke is a rigid body, and is held down firmly, and bears on the frame and indirectly on the roller Q, by direct bearing of its antifriction rollers 44 on the supplemental friction rollers $Q'$, $Q^2$. Rollers Q, Q', $Q^2$, are always in driving contact, one with the others.

Assuming that the controlling cams 30 and 31 are so set that the driving rollers L and L' are not in contact, let the frame 28, 28, be thrown to the right. The drive roller Q will be forced against roller L, and will turn in the direction of the arrow (Fig. 4). This movement will throw out roller $Q^2$ but will wedge roller Q' between roller 44, and drive roller L', and turn that in the direction opposite to that of drive L, and as the corresponding cone drivers act on opposite sides of the disks, both driving cones will coact and impel the vehicle—in this case ahead. Reverse movement of the frame 28, 28, will cause in the same measure, the rollers to act in the opposite direction and thus back the vehicle.

The operation of the parts is as follows: It will be observed that the drive throughout is by frictional contact. When by operation of the control lever, through the rod 24, the driving cones K, K', are forced rearward, the beveled disks are spread against the action of their springs, the driving surface of the cones is extended and brought nearer to the center of the driving disks, the frictional surface and pressure, and therefore the power, are increased with diminution of speed. Reverse movement of the cones manifestly produces reverse effect, and any degree of change may be made. This action is independent of the other movements. To steer to the right or left the steering post T, illustrated in Fig. 6, is turned to release either one or the other of the cams 30, 31. This movement releases one or the other of rolls L, L', and lets free one or the other of the driving cones according to the movement of the steering wheel.

In order to render both K, and K' ineffective the rolls Q, Q', and $Q^2$ are brought by the control lever of rod 41, to a middle position, when they are out of effective contact with both K and K'.

I claim substantially as described:—

1. In a power transmission mechanism for vehicles, and in combination with the divided axle, a beveled frictional driving disk on each part of said axle, splined on said part and under spring pressure, roller bearings loosely mounted on the two parts of said divided axle and two interior beveled wheels carried thereon, each pressed normally outward toward the adjacent disk, a pair of shafts, a pair of cone drivers thereon, said cone drivers interposed between said frictional driving disks, and beveled wheels, and movable on their shafts toward and from said driving disks on axial lines, and means for reciprocating said cones upon their shafts, substantially as described.

2. In a power transmission mechanism for vehicles, and in combination with the divided axle, a pair of beveled frictional driving disks, each splined to one part of said axle and under spring pressure, roller bearings loosely mounted on said axle parts and a pair of beveled wheels carried thereon, each pressed under spring pressure toward the adjacent frictional disk, a pair of shafts interposed between said frictional disks and said beveled wheels, a pair of cone drivers movably mounted thereon, and a pair of shafts, a second pair of counteracting cones thereon and under spring pressure adapted to be interposed between the frictional disks and beveled wheels at a point diametrically opposite from said cone drivers, substantially as described 3. In a power transmission mechanism for a vehicle and in combination with the divided axle, a pair of beveled frictional driving disks, each splined to a part of said axle and under spring pressure, roller bearings loosely mounted on said axle parts, and a pair of complementary beveled wheels carried thereon, each bearing outwardly under spring pressure toward the adjacent driving disk, a pair of shafts interposed between said driving disks and said beveled wheels and a pair of cone drivers mounted thereon, and a pair of shafts, a pair of coacting idle double cones thereon, each of said double cones adapted to bear inwardly on the adjacent driving cone and disk, and means for reciprocating said cone drivers on their shafts, substantially as described.

4. In a power transmission mechanism for a vehicle, and in combination with the divided axle, a pair of beveled frictional driving disks, each splined to a part of said axle and under spring pressure, roller bearings loosely mounted on said axle parts and a pair of beveled wheels carried thereon, each of said wheels bearing outwardly under spring pressure toward the adjacent driving disk, a pair of shafts interposed between said driving cones and said beveled wheels, and a pair of cone drivers movably mounted thereon, a pair of shafts, a second pair of cones movably mounted thereon counteracting said driving cones and under spring pressure adapted to be interposed between the adjacent driving disk and beveled wheel, and a pair of shafts, a pair of counteracting idle double cones thereon under spring pressure, each adapted to bear on the adjacent driving cone and disk, and means for reciprocating said cone drivers on their shafts relatively to the driving disk, substantially as described.

In testimony whereof, I affix my signature in presence of two witnesses.

ROBERT C. MANGUM.

Witnesses:
 EWD. L. TOLSON,
 BURNETT S. JONES.